United States Patent [19]

Kuban et al.

[11] Patent Number: 4,994,908
[45] Date of Patent: Feb. 19, 1991

[54] INTERACTIVE ROOM STATUS/TIME INFORMATION SYSTEM

[75] Inventors: Curt M. Kuban, Snellville; Jeffrey C. Ting, Lawrenceville; Fitzroy E. Williams, Lawrenceville; Lee R. Johnson, Lawrenceville; Elizabeth A. Smith, Cumming; Howard L. Myers, Lawrenceville, all of Ga.

[73] Assignee: Scientific-Atlanta, Inc., Atlanta, Ga.

[21] Appl. No.: 340,660

[22] Filed: Apr. 20, 1989

Related U.S. Application Data

[63] Continuation-in-part of Ser. No. 289,218, Dec. 23, 1988.

[51] Int. Cl.$^5$ ............................................. H04N 7/10
[52] U.S. Cl. .................................... 358/86; 455/5
[58] Field of Search ....................... 358/86; 455/5, 4

[56] References Cited

U.S. PATENT DOCUMENTS

| | | | |
|---|---|---|---|
| 3,484,748 | 12/1969 | Greenblum et al. | 340/825.28 |
| 3,539,999 | 11/1970 | Houldin et al. | 340/711 |
| 3,636,315 | 1/1972 | Comeau | 235/61.7 |
| 3,675,204 | 7/1972 | Miehle et al. | 340/525 |
| 3,705,422 | 12/1972 | Savey | 340/286.08 |
| 3,742,141 | 6/1973 | Duncan et al. | 379/102 |
| 3,797,009 | 3/1974 | Crudgington, Jr. | 340/286.08 |
| 3,810,096 | 5/1974 | Kabat et al. | 340/534 |
| 3,819,862 | 6/1974 | Hedges | 379/99 |
| 3,833,757 | 9/1974 | Kirk, Jr. et al. | 358/86 |
| 3,854,009 | 12/1974 | Pirnie, III | 379/106 |
| 3,894,176 | 7/1975 | Mellon | 358/84 |
| 3,894,177 | 7/1975 | Howell et al. | 358/143 |
| 3,924,071 | 12/1975 | Pirnie, III | 379/104 |
| 3,944,742 | 3/1976 | Cunningham | 455/2 |
| 3,968,327 | 7/1976 | Gregg, III | 358/86 |

(List continued on next page.)

FOREIGN PATENT DOCUMENTS 1536534 12/1978 United Kingdom .
WO86/01962 3/1986 World Int. Prop. O. ............ 358/86

OTHER PUBLICATIONS

NCR Skylink, NCR Corporation, Dayton, OH 45479, pp. 1-12.

Primary Examiner—Jin F. Ng
Assistant Examiner—Wing F. Chan
Attorney, Agent, or Firm—Banner, Birch, McKie & Beckett

[57] ABSTRACT

An interactive room status/time information system is provided having a terminal associated with a television comprising a processor for processing data, an associated memory for storing operation data and control algorithms, a keypad with remote control for inputting information, a character generator responsive to the processor for generating a multiple character, multiple line display, a power supply input, and a cable transmission link for communication at television frequencies with a system manager. A maid or inspector can send status information from a hotel/hospital room terminal over a cable television system to a system manager location. The status of a room for occupancy is determined by a two-step procedure. Input from both a maid and an inspector must be received before a room has a ready-for-occupancy status. Screens of compiled room status and historical data can be displayed at the system manager. Also, certain screens of room status data may be displayed on an associated television at the room terminal. Functions can be performed at the system manager location including searching stored status information for historical data of a particular room or maid. In accordance with a further time control feature of the present system, a hotel guest may actuate a wake-up mode of operation of a room terminal through a terminal keyboard or remote control. The system manager subsequently polls the terminal to determine if the room terminal is properly operating or if the wake-up alarm has been responded to. If not, hotel personnel may be dispatched to the room.

42 Claims, 14 Drawing Sheets

U.S. PATENT DOCUMENTS

| | | | |
|---|---|---|---|
| 4,031,543 | 6/1977 | Holz | 358/86 |
| 4,057,829 | 11/1977 | Moorehead | 358/86 |
| 4,072,825 | 2/1978 | McLay et al. | 379/104 |
| 4,156,847 | 5/1979 | Tazawa et al. | 325/308 |
| 4,186,438 | 1/1980 | Benson et al. | 364/200 |
| 4,194,181 | 3/1980 | Brundage | 340/286 |
| 4,264,924 | 4/1981 | Freeman | 358/86 |
| 4,303,937 | 12/1981 | Cook | 358/86 |
| 4,319,277 | 3/1982 | Nicholson et al. | 358/165 |
| 4,360,828 | 11/1982 | Briggs, Jr. et al. | 358/86 |
| 4,365,267 | 12/1982 | Tsuda | 358/84 |
| 4,385,314 | 5/1983 | Yashiro et al. | 358/84 |
| 4,409,592 | 10/1983 | Hunt | 340/825.5 |
| 4,414,621 | 11/1983 | Bown et al. | 364/200 |
| 4,429,299 | 1/1984 | Kabat et al. | 340/310 |
| 4,439,784 | 3/1984 | Furukawa et al. | 358/86 |
| 4,449,186 | 5/1984 | Kelly et al. | 364/407 |
| 4,451,701 | 5/1984 | Bendig | 379/96 |
| 4,451,895 | 5/1984 | Sliwkowski | 364/521 |
| 4,455,570 | 6/1984 | Saeki et al. | 358/86 |
| 4,510,568 | 4/1985 | Kishi et al. | 364/300 |
| 4,536,791 | 8/1985 | Campbell et al. | 358/122 |
| 4,538,174 | 8/1985 | Gargini et al. | 358/86 |
| 4,567,512 | 1/1986 | Abraham | 358/86 |
| 4,574,305 | 3/1986 | Campbell et al. | 358/86 |
| 4,575,579 | 3/1986 | Simon et al. | 178/4 |
| 4,586,035 | 4/1986 | Baker et al. | 340/712 |
| 4,613,946 | 9/1986 | Forman | 364/518 |
| 4,616,214 | 10/1986 | Naito | 340/533 |
| 4,658,290 | 4/1987 | McKenna et al. | 358/84 |
| 4,752,876 | 6/1988 | Couch et al. | 364/407 |
| 4,782,463 | 11/1988 | Sanders et al. | 364/900 |
| 4,786,967 | 11/1988 | Smith, III et al. | 358/143 |
| 4,789,863 | 12/1988 | Bush | 340/825 |
| 4,792,849 | 12/1988 | McCalley et al. | 358/86 |
| 4,829,560 | 3/1989 | Evanyk et al. | 379/106 |
| 4,829,569 | 5/1989 | Seth-Smith et al. | 358/86 |

FIG. 3

©1988 SCIENTIFIC-ATLANTA, INC.

| 9:52 PM | | ROOM STATUS | | | 01/12/89 |
|---|---|---|---|---|---|
| | | SORTED BY : ALL ROOMS | | | |
| ROOM | CURRENT STATUS | ROOM | CURRENT STATUS | ROOM | CURRENT STATUS |
| 101 | -OCCUPIED / CLEAN | 102 | -OCCUPIED / CLEAN | 103 | -VACANT / DIRTY |
| 104 | -OCCUPIED / CLEAN | 105 | -VACANT / CLEAN | 108 | -OCCUPIED / DIRTY |
| 109 | -OCCUPIED / DIRTY | 110 | -OCCUPIED / DIRTY | 111 | -OCCUPIED / #1234 |
| 203 | -OCCUPIED / #745 | 205 | -OCCUPIED / DIRTY | 207 | -OCCUPIED / CLEAN |
| 209 | -OCCUPIED / DIRTY | 377 | -OUT OF SERVICE | 378 | -OCCUPIED / DIRTY |
| 401 | -OCCUPIED / DIRTY | 402 | -OCCUPIED / DIRTY | 403 | -OCCUPIED / DIRTY |
| 404 | -VACANT / CLEAN | 450 | -VACANT / #122 | 460 | -OCCUPIED / CLEAN |
| 505 | -OUT OF SERVICE | 507 | -VACANT / CLEAN | 509 | -VACANT / DIRTY |
| 600 | -OCCUPIED / CLEAN | 700 | -VACANT / CLEAN | 900 | -VACANT / CLEAN |

| VIEW | DIRTY | CLEAN | READY | ROOM | MAID |
| OUT OF SERVICE | OCCUPIED | | VACANT | | |
| CHANGE IDs | DISPLAY IDs | | SORT | | |
| FIND MAID | BACKUP LOG | | MAIN MENU | | |

[F1] HELP [F9] TO PRINT A FULL REPORT, [F10] TO PRINT THE SCREEN
[PGUP], [PGDN], [^], [v], [<], [>], [ENTER] MAKE SELECTION

FIG. 4

© 1988 SCIENTIFIC-ATLANTA, INC.

| 9:52 PM | | ROOM STATUS | | | 01/12/89 |
|---|---|---|---|---|---|

SORTED BY: ALL ROOMS

| ROOM | CURRENT STATUS | ROOM | CURRENT STATUS | ROOM | CURRENT STATUS |
|---|---|---|---|---|---|
| 101 | -OCCUPIED / CLEAN | 102 | -OCCUPIED / CLEAN | 103 | -VACANT / DIRTY |
| 104 | -OCCUPIED / CLEAN | 105 | -VACANT / CLEAN | 108 | -OCCUPIED / DIRTY |
| 109 | -OCCUPIED / DIRTY | 110 | -OCCUPIED / DIRTY | 111 | -OCCUPIED / #1234 |
| 203 | -OCCUPIED / #745 | 205 | -OCCUPIED / DIRTY | 207 | -OCCUPIED / CLEAN |
| 209 | -OCCUPIED / DIRTY | 377 | -OUT OF SERVICE | 378 | -OCCUPIED / DIRTY |
| 401 | -OCCUPIED / DIRTY | 402 | -OCCUPIED / DIRTY | 403 | -OCCUPIED / DIRTY |
| 404 | -VACANT / CLEAN | 450 | -VACANT / #122 | 460 | -OCCUPIED / CLEAN |
| 505 | -OUT OF SERVICE | 507 | -VACANT / CLEAN | 509 | -VACANT / DIRTY |
| 600 | -OCCUPIED / CLEAN | 700 | -VACANT / CLEAN | 900 | -VACANT / CLEAN |

```
SORT:  CLEAN             DIRTY             READY              VACANT
       CLEAN\OCCUPIED    DIRTY\OCCUPIED    READY\OCCUPIED     OCCUPIED
       CLEAN\VACANT      DIRTY\VACANT      READY\VACANT       OUT OF SERVICE
       ALL ROOMS         PREVIOUS MENU
```

[F1] HELP  [F9] TO PRINT A FULL REPORT, [F10] TO PRINT THE SCREEN
[PGUP], [PGDN], [↑], [↓], [<], [>], [↵] ENTER] MAKE SELECTION

FIG. 5

©1988 SCIENTIFIC-ATLANTA, INC.

```
9:52 PM                          ROOM STATUS                      01/12/89

SORTED BY: DIRTY / OCCUPIED

ROOM  CURRENT STATUS      ROOM  CURRENT STATUS      ROOM  CURRENT STATUS
────────────────────      ────────────────────      ────────────────────
103   -OCCUPIED / DIRTY   108   -OCCUPIED / DIRTY   109   -OCCUPIED / DIRTY
110   -OCCUPIED / DIRTY   111   -OCCUPIED / #1234   203   -OCCUPIED / #908
379   -OCCUPIED / #745    380   -OCCUPIED / DIRTY   402   -OCCUPIED / DIRTY
403   -OCCUPIED / DIRTY

VIEW          CLEAN         READY
OUT OF SERVICE OCCUPIED     VACANT       ┌─ROOM──┐         ┌─MAID──┐
CHANGE IDs    DISPLAY IDs   SORT         │       │         │       │
FIND MAID     BACKUP LOG    MAIN MENU    └───────┘         └───────┘

[F1] HELP  [F9] TO PRINT A FULL REPORT,  [F10] TO PRINT THE SCREEN
[PGUP], [PGDN], [^], [v], [<], [>], [↵ ENTER] MAKE SELECTION
```

FIG. 6

©1988 SCIENTIFIC-ATLANTA, INC.

```
9:52 PM                    CHANGE IDS                    01/22/88

ADD NEW NAME                ┌── EMPLOYEE NAME ──┐
    CHANGE NAME                 │  DUNN / CATHERINE S │
    CHANGE IDENTIFICATION       ├──── AUTHORIZATION ──┤
    CHANGE AUTHORIZATION        │        MAID         │
    VIEW NAME                   ├──── IDENTIFICATION ─┤
    VIEW IDENTIFICATION         │        1234         │
    RETURN TO PREVIOUS MENU     └─────────────────────┘
    RETURN TO MAIN MENU

[F1] HELP [F9] TO PRINT A FULL REPORT,  [F10] TO PRINT THE SCREEN
 [PGUP], [PGDN], [^], [v], [<], [>], [↵ ENTER] MAKE SELECTION
```

FIG. 7

©1988 SCIENTIFIC-ATLANTA, INC.

```
9:52 PM               IDENTIFICATION NUMBERS             01/12/89

ID    AUTH   NAME                  ID    AUTH   NAME
 ────  ────   ──────────────        ────  ────   ──────────────
 0011  MAID   DUNN / DELORES R      0012  MAID   DUNN / CATHERINE S
 0304  MAID   FONTAYNE / DEBRA P    0701  MAID   JACKSON / MARY E
 2098  SUPV   FRANK / HENRY W       3077  SUPV   SMITH / SARAH F

PREVIOUS MENU         RETURN TO MAIN MENU

[F1] HELP [F9] TO PRINT A FULL REPORT,  [F10] TO PRINT THE SCREEN
 [PGUP], [PGDN], [^], [v], [<], [>], [↵ ENTER] MAKE SELECTION
```

FIG. 9
©1988 SCIENTIFIC-ATLANTA, INC.
| ROOM # | MAID # | START TIME | FINISH TIME |
|--------|--------|------------|-------------|
| ROOM # | MAID # | START TIME | FINISH TIME |
| ROOM # | MAID # | START TIME | FINISH TIME |
| . . | . . | . . | . . |
FIG. 14(a)
©1988 SCIENTIFIC-ATLANTA, INC.
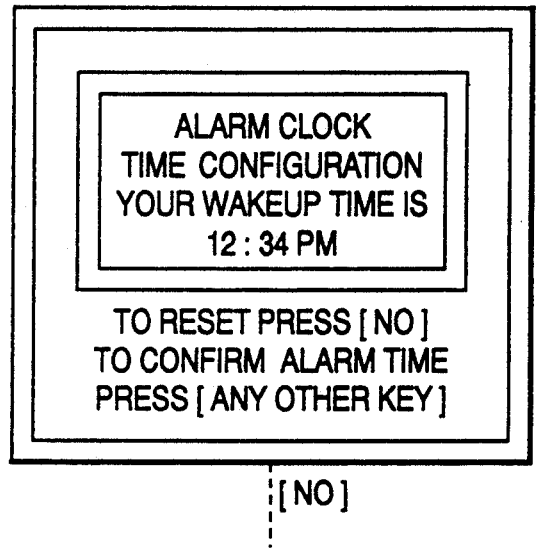
FIG. 14(b)
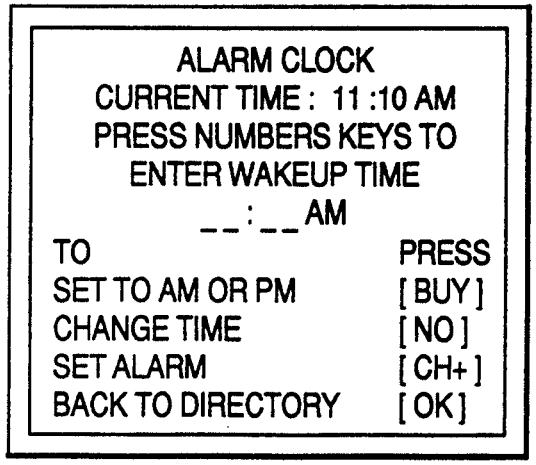

©1988 SCIENTIFIC-ATLANTA, INC.

FIG. 11(a)
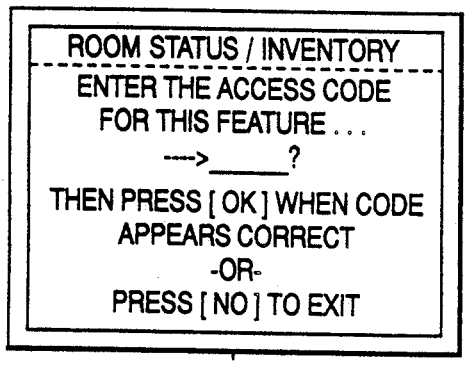
©1988 SCIENTIFIC-ATLANTA, INC.
FIG. 11(b)
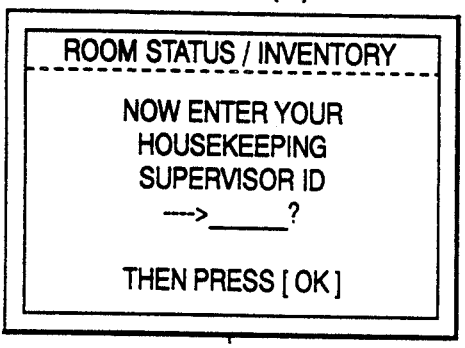
FIG. 11(c)
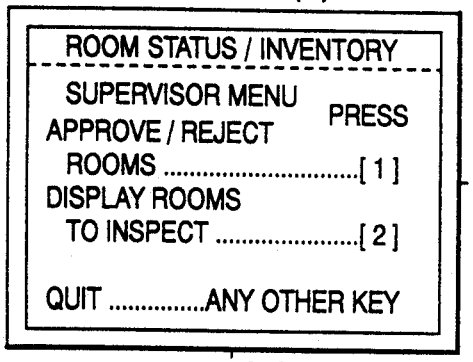
[1]
TO FIG. 11(e)
FIG. 11(d)
| ROOMS READY FOR INSPECT | | |
|---|---|---|
| 100 | 102 | 115 |
| 117 | 131 | 135 |
| 204 | 208 | 239 |
| 303 | 507 | 509 |
| 511 | 512 | 513 |
[CH+/CH-]   [OK] SUPV MENU

FIG. 11(e)

FROM FIG. 11(c)

```
ROOM STATUS / INVENTORY
                              PRESS
SINGLE ROOM ..............   [ 1 ]
RANGE OF ROOMS ........      [ 2 ]
SUPERVISOR MENU ......       [ CH- ]

QUIT ............ ....ANY OTHER KEY
```

FIG. 11(f)

```
ROOMS READY FOR INSPECT
       ENTER ROOM NAME
       --->_____?
AND THEN                   PRESS
TO ACCEPT ROOM...........  [ OK ]
TO REJECT ROOM...........  [ NO ]
TO RETRY.......................  [ BUY ]
TO PREVIOUS MENU.......  [ CH- ]
TO QUIT...........................  [ CH+ ]
```

FIG. 11(g)

```
ROOM STATUS / INVENTORY
    ENTER THE BEGINNING OF
    A RANGE OF ROOM NAMES
       --->_____?
AND THEN                 PRESS
IF CORRECT ..................  [ OK ]
TO RETRY ......................  [ BUY ]
TO PREVIOUS MENU ......  [ CH- ]
TO QUIT ..........................  [ NO ]
```

TO FIG. 11(h)

©1988 SCIENTIFIC-ATLANTA, INC.

FIG. 11(h)

FROM FIG. 11(g)

```
ROOM STATUS / INVENTORY
-----------------------------
     ENTER THE END OF A
     RANGE OF ROOM NAMES
       --->_____?

AND THEN              PRESS
IF CORRECT ............ [ OK ]
TO RETRY .............. [ BUY ]
TO PREVIOUS MENU ...... [ CH- ]
TO QUIT ............... [ NO ]
```

© 1988 SCIENTIFIC-ATLANTA, INC.

FIG. 11(i)

```
ROOM STATUS / INVENTORY
-----------------------------
  BEGIN WITH ROOM     1101
  END WITH ROOM       1115

AND THEN ............. PRESS
TO ACCEPT ............ [ OK ]
TO REJECT ............ [ NO ]
TO CANCEL ............ [ BUY ]
```

```
ROOM STATUS / INVENTORY
-----------------------------
ROOMS 1101
THROUGH ROOMS 1115
HAVE BEEN REJECTED

PRESS
ANOTHER RANGE ........ [ OK ]
SUPERVISOR MENU ...... [ CH- ]
TO QUIT ........... ANY OTHER
                          KEY
```

```
ROOM STATUS / INVENTORY
-----------------------------
ROOMS 1101
THROUGH ROOMS 1115
HAVE BEEN ACCEPTED

PRESS
ANOTHER RANGE ........ [ OK ]
SUPERVISOR MENU ...... [ CH- ]
TO QUIT ........... ANY OTHER
                          KEY
```

FIG. 12

© 1988 SCIENTIFIC-ATLANTA, INC.

WAKEUP ALARMS                                                01/22/89

9:52 PM

| ROOM | TIME | ROOM | TIME | ROOM | TIME | ROOM | TIME |
|------|------|------|------|------|------|------|------|
| 103 | 6:01 AM | 109 | 5:30 AM | 115 | 10:00 AM | 203 | 10:01 AM |
| 309 | 7:17 AM | 409 | 7:00 AM | 422 | 7:15 AM | 707 | 7:27 AM |
| SUITE-1 | 8:00 AM | SUITE-2 | 8:20 AM | | | | |
| : | : | : | | | | | |

ADD
DELETE
RETURN TO MAIN MENU

ROOM: 1234567     TIME: 07:27 AM

[F9] TO PRINT A FULL REPORT, [F10] TO PRINT THE SCREEN
[PGUP], [PGDN], [^], [v], [<], [>], [↵ ENTER] MAKE SELECTION

INTERACTIVE ROOM STATUS/TIME INFORMATION SYSTEM

CROSS-REFERENCE TO RELATED APPLICATIONS

This application is a continuation-in-part of U.S. application Ser. No. 289,218, filed Dec. 23, 1988 and entitled "Automatic Interactive Television Terminal Configuration" and is related to U.S. application Ser. Nos.: 07/340,642, entitled "Cable Television Transaction Terminal"; 07/342,987, entitled "Storage Control Method and Apparatus for an Interactive Television Terminal"; 07/340,731, entitled "Terminal Authorization Method"; 07/340,987, entitled "Interactive Television Terminal with Programmable Background Audio or Video"; and 07/340,659, entitled "Terminal Polling Method" filed concurrently herewith.

BACKGROUND OF THE INVENTION

1. Technical Field

This invention primarily relates to the field of two-way interactive hotel/hospital systems typically provided over cable facilities and, more particularly, relates to a method and apparatus for room status, for timekeeping and for wake-up communications.

2. Description of the Relevant Art

Two-way interactive cable television systems are known for transmitting entertainment, information and data signals over a cable facility toward a plurality of users. Data may be transmitted and addressed to a particular subscriber over a separate data channel or a so-called "in-band" data channel. In a downstream direction, address control data may represent services authorized to a particular terminal or control commands to that terminal. In an upstream direction, from a terminal to the service provider or system manager location, control data may represent selections made by a user in response to a polling request or at the time of user selection.

Terminals are often manufactured with stored unique identification numbers which may be unknown to a user for security purposes. Nevertheless, the unique identification number is necessary for the system manager to enter a terminal into a system along with location related information and configuration information.

Interactive terminals generally have been equipped without the capability of locally generating a display such as alphanumeric characters on an associated television receiver. A terminal-provided display such as a liquid crystal display of a selected channel number at a terminal is inadequate for providing an effective man-machine interface for accomplishing a complicated task.

Keys normally provided at interactive terminals comprise a complement of numeric input keys, channel increment keys, volume control keys, a power button and a "buy" key. However, these keys are inappropriately labeled and may confuse the user if simultaneously employed for other uses.

An addressable CATV converter with a graphics display generator to generate signals for the presentation of text on a television screen is described in U.S. Pat. No. 4,536,791, specifically incorporated herein by reference. Although this patent increases the display capability of an addressable converter, it does not expand the interactive functions of the converter.

It is also known in the art of non-interactive cable television terminals having a programmable read only memory to enable remote programming of the terminal. Remote programming is enabled via inputting a special code not provided with the standard remote control transmitter associated with the terminal. According to U.S. Pat. No. 4,792,972, which issued Dec. 20, 1988, entitled "Remote Programming Of A CATV Channel Authorization Unit" and incorporated herein by reference, an installer employs a special programming unit equipped with, for example, an infrared transmitter to remotely program the read only memory of a so-called "plain Jane" converter, which is not addressable over a communications link by a system manager, nor is the converter capable of return transmissions. Via the special code, access is obtained to the read only memory into which the memory is loaded with premium channels and services authorization data. The converter is not equipped with a character generator and has no capability to locally generate character screens for display on an associated television receiver. All activities are controlled from the special code transmitting remote programming unit.

Systems for communicating room status information of buildings are known in the art. For example, U.S. Pat. No. 3,675,204, describes a system for monitoring the status of hotel rooms by communicating information at low frequencies over a twisted pair, preferably connected directly to telephone lines in a hotel. Maids and inspectors can determine whether a room is clean or dirty on terminals placed throughout the hotel. Transmitting terminals are located in closets. The maids enter room numbers and an "occupied" or "vacant" status at the terminals. A main display panel displays the status of rooms once collected for display.

British patent specification No. 1,536,534, published Dec. 20, 1978, describes a computer-based hotel management system. Room status information such as vacant, vacant and out-of-service, cleaned, not cleaned, being cleaned, and ready for inspection are possible. Insertion or removal of a maid or housekeeper's key into a hard wired switch causes the status of a room to change. Morning call capability is also disclosed via an alarm buzzer connected to a refrigerated drink storage unit provided in a hotel room. A morning call request is entered into the system at a porter's keyboard/printer. When a cancel button in the room is depressed, the central computer is informed and the alarm is cancelled. If a guest does not respond within five minutes, a warning message is printed on the porter's terminal and the call is automatically cancelled.

The above systems all require specialized wiring and hardware for communication. Furthermore, they do not provide for direct communication from each room. Communication for room status and morning call capabilities is difficult because of the limited input/output capabilities of the hardware. In these prior systems, a limited display capability, if any, is used at each room. The addition of a more capable display to such existing systems would be very costly. Furthermore, these prior systems require added installation expense for connection of twisted pairs to telephone lines or for connection of hard wires to a central computer. These prior systems are not capable of communicating over existing communication mediums using little if any additional hardware; they require the addition of costly input/output switches and displays.

U.S. Pat. No. 3,819,862 describes a hotel room status information system. Portable units are connected to a telephone network to send room status data to a hotel manager or to a housekeeper display. Transmission of status data via a television antenna cable is discussed as a possible alternative to the particularly disclosed transmission by telephone line using audio frequency signals.

U.S. Pat. Nos. 3,944,742 and 4,360,828, discuss a hotel communication system for transmission of data from a plurality of transmitters over a master antenna television system (MATV). Transmission of maid status data over an antenna television system is suggested, yet specific details of what the data comprise or how to gather this maid status information are not explained.

There remains a need in the art for a room status/time information system for communicating from hotel rooms with little if any additional hardware over an existing communication medium having low cost, high capability input/output and a low cost, high capability display.

SUMMARY OF THE INVENTION

It is an object of the present invention to provide an interactive room terminal capable of being configured for specialized functions.

It is a further object of the present invention to provide an interactive terminal for communication over a building's cable television system.

It is a further object of the present invention to provide an interactive terminal with an alphanumeric display on an associated television screen.

It is a further object of the present invention to provide a room communication system for communicating with little or no additional hardware over an existing communication medium.

It is a further object of the present invention to provide a room communication system having a configurable input keyboard with remote control using little if any additional hardware.

It is a still further object of the present invention to provide a room communication system having a programmable multiple character, multiple line display using little if any additional hardware.

It is a further object of the present invention to provide an interactive terminal capable of communicating room status information.

It is a further object of the present invention to provide a room status system capable of sorting historical data on the status of rooms or the activities of a maid.

It is a further object of the present invention to provide a room status system capable of input by a maid supervisor/room inspector.

It is a further object of the present invention to provide a room status system capable of performing maid or supervisor timekeeping functions.

It is a further object of the present invention to provide a system for communicating time information between a system manager and a plurality of room terminals.

It is a further object of the present invention to provide a time correction feature for sending time correction signals from a system manager to room terminals in the event of a power failure.

It is a further object of the present invention to provide an interactive terminal for sounding a wake-up or other alarm at a predetermined time.

It is a further object of the present invention to provide a multi-room wake-up system wherein wake-up can be ordered at a room terminal.

It is a further object of the present invention to provide a multi-room wake-up system capable of tabulating requested wake-ups at a system manager.

It is a further object of the present invention to provide a multi-room wake-up system capable of indicating the tabulation of rooms not responding to a wake-up alarm.

It is a further object of the present invention to provide a multi-room wake-up system capable of indicating the need for a manual wake-up call prior to the time of a scheduled wake-up call in the event of an inoperative room terminal.

The problems and related deficiencies of the prior art are solved by the principles of the present invention, an interactive room status/time information system having a terminal associated with a television comprising a processor for processing data, an associated memory for storing operation data and for storing control algorithms, a keypad with remote control for inputting information, a two-way cable television transceiver, a character generator responsive to the processor for generating a multiple character, multiple line display on the associated television, and a power supply input, the cable television transceiver for two-way communication at cable television frequencies with a system manager.

A maid or inspector (maid's supervisor) sends status information from the terminal over a cable transmission link to a system manager location, at which location, the time of data reporting may be stored in memory. At the system manager, room status information such as occupied/vacant and dirty/clean can be tabulated and displayed for all the rooms in the hotel. Also, for example, timekeeping data and identification of a particular maid presently making up a room or identification of a room which is out-of-service can also be displayed.

The status of a room for occupancy is determined by a two-step procedure. First, an input from a maid must be received before a room can have a clean status. Second, an input from an inspector (maid's supervisor) must be received before a room can have a ready-for-occupancy status.

Also, custom screens are displayed at the system manager or alternatively at the room terminal, including, for example, maid and inspector sign-on screens, maid and inspector data-input screens, rooms-to-be-made-up screens, rooms-to-be-inspected screens, room-status display screens or the like. Furthermore, other displays and functions can be performed at the system manager location including, for example, searching and short-term storage of status information, long-term storage on disk of status information and searching stored status information for historical data of the status of a particular room or the activities of a particular maid. These advanced capabilities allow features such as finding the location of a maid at any given time or displaying a sorted list of rooms to be inspected, occupied or the like.

A hotel guest may actuate a wake-up mode of operation of a room terminal through a terminal keyboard or remote control. First, a user selects a wake-up service screen and enters the exact wake-up time. The terminal then associates the terminal with the room number and stores the time for wake-up. At the appointed time for wake-up, the terminal activates a piezoelectric alarm to wake the guest. The system manager periodically, for example, every minute updates the accurate time reported by a clock of the terminal. Consequently, the time reported by the terminal is corrected automatically in the event of a power outage.

The system manager periodically polls the terminal to obtain the user entered time and room number. The system manager subsequently polls the terminal at the appointed time to determine if the wake-up alarm has been responded to. If not, hotel personnel may be dispatched by the system manager to the room to determine if, for example, the hotel guest is a heavy sleeper or has had a heart attack. As an additional feature, the system manager determines if the room terminal is out of order within a predetermined number of minutes prior to a scheduled wake up time. If the terminal is in fact out of order, the system manager may actuate a warning alarm to dispatch hotel personnel to wake the hotel guest.

The present invention improves upon the prior room status communication and wake-up techniques. Communication is integrated into an existent communication medium between each hotel/hospital room and a central location, i.e., where the system manager may be located. Little if any additional hardware is required for connection to the chosen communication medium or for input/output and display with a user. A programmable multi-line, multi-character display is also provided at no additional cost. Also the keys on a room terminal or, alternatively, on a remote control are individually configurable to particular functions.

These and other features of the present invention will become evident from the following detailed description of the invention when read in conjunction with the appended drawings.

BRIEF DESCRIPTION OF THE DRAWINGS

FIG. 3 is an exemplary screen for display at the system manager. This screen is exemplary of a tabulation of rooms and their status. A menu of commands is also included in the exemplary screen.

FIG. 4 is another exemplary screen illustrating the menu of sort commands when the sort option is selected from the menu of FIG. 3.

FIG. 5 is another exemplary screen illustrating the tabulation of rooms and their status sorted by dirty/occupied.

FIG. 6 is another exemplary screen of the change ID option.

FIG. 7 is another exemplary screen of the display ID option.

FIG. 9 exemplifies a display used for maid timekeeping.

FIGS. 11(a)-11(k) are other screens exemplary of inspector sign-on and room inspection functions including display of rooms to be inspected and for logging the inspection of a range of rooms generated for display on a television receiver associated with a room terminal according to FIG. 2.

FIG. 12 is an exemplary screen for display at the system manager of selected wake-up times for particular rooms.

FIGS. 14(a) and 14(b) are screens exemplary of a wake-up request sequence generated for display on a television receiver associated with a room terminal according to FIG. 2.

DETAILED DESCRIPTION OF THE INVENTION

Figure 1:
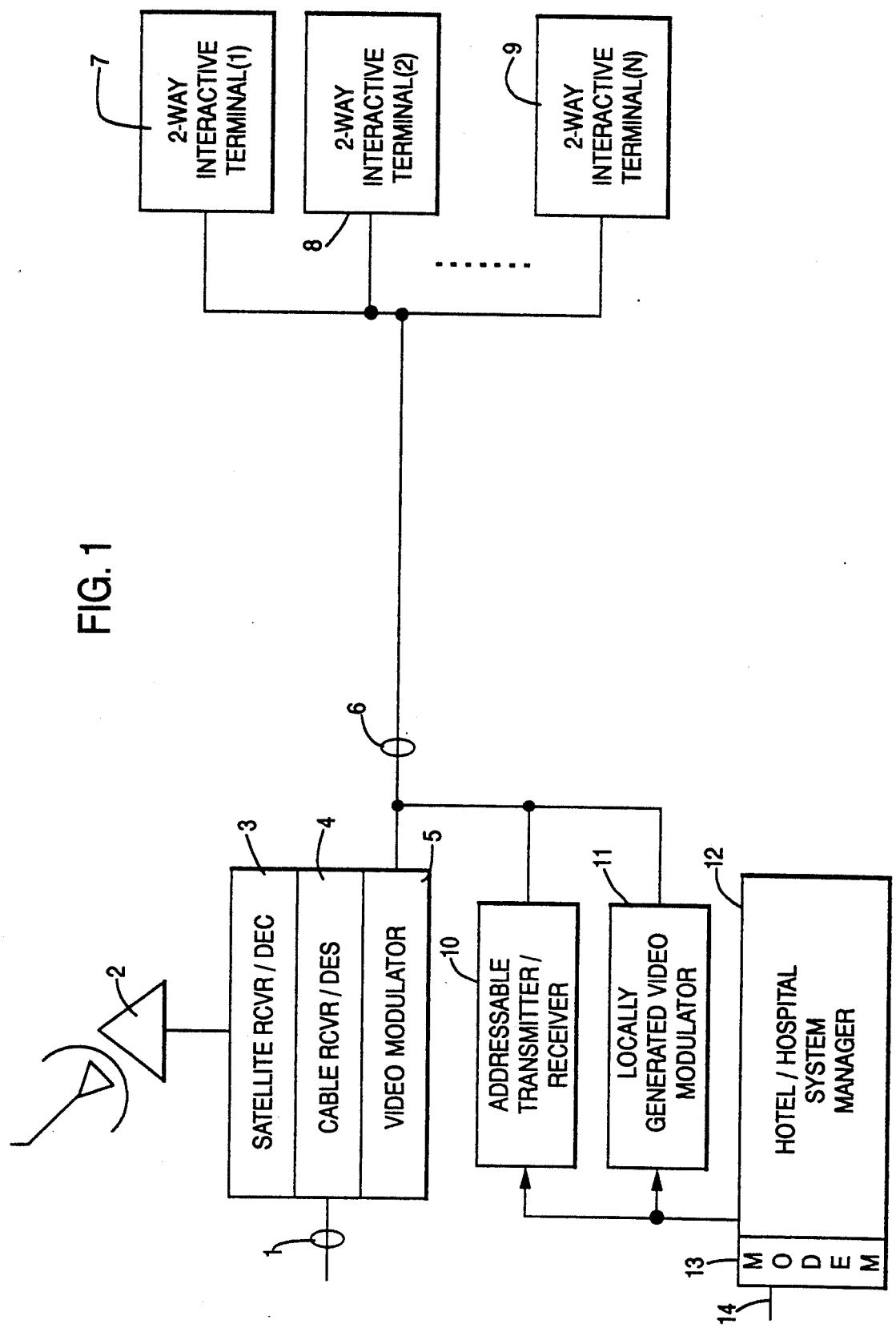
FIG. 1 is a block schematic diagram of an interactive room status/time information system in accordance with the present invention.

Referring to FIG. 1, there is shown a block schematic diagram of an interactive room status/time information system in accordance with the present invention. The depicted embodiment relates to its application in a hotel or hospital system environment; however, the present invention is not so limited. The present invention may also be applied in any two-way interactive system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system headend. Besides the use of the above-mentioned equipment at the headend of a city-wide cable television distribution system, the above-mentioned equipment can be used, for example, at a central location at a hotel, hospital, cruise ship, office building, apartment complex, airport, factory, prison, univeristy, or any other similar facility. In this example, transmission link 6, for example, a coaxial cable or optical fiber link can connect the cable television headend to two-way interactive terminals 7, 8 or 9 of the entertainment system located at individual subscriber premises.

On the other hand, the embodiment of FIG. 1 is especially exemplary of the application of the present invention in a hotel or hospital system. Transmission link 6, then, may simply comprise a coaxial or optical fiber cable link between a control center and N terminals, for example, terminals 7, 8 or 9 located in rooms of the facility. The terminals can be located at various locations throughout a facility such as a hotel room, a hospital room, a ballroom, a conference room, a clerk inspector or other individual's office, a broom closet, a laundry room, a casino, a break room, a nurse station, a front desk, a message center, a lecture hall, a lounge, a dorm room, a work station, a laboratory, a guard desk, a prison cell or any other similar location in a facility. Many uses are possible for the room terminal besides room status, timekeeping and wake up. The room terminal can be used for ordering room service, for checkout, for video conferencing, for premium program selection, for shopping, for bulletin board information, for airline reservations, for gambling and gambling or any other service used in a facility. Further details of room service and room checkout services are incorporated herein by reference to U.S. application Ser. No. 07/340,642 entitled "Cable Television Transaction Terminal." Further details of video conferencing and premium program selection are incorporated herein by reference to U.S. application Ser. No. 07/340,731 entitled "Terminal Authorization Method."

In particular, at the control center, a satellite signal may be received at satellite antenna 2 and then received and decoded at satellite receiver decoder 3 for distribution via modulator 5 over a distribution cable 6 to the interactive terminals 7, 8 or 9 of the present invention. Also, in accordance with the present invention, the satellite signal may comprise a signal continuously indicating the accurate time. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optional scrambler may be provided for scrambling premium channel transmissions to interactive terminals 7, 8, or 9. Of course, terminals 7, 8, or 9 then would comprise descrambler circuitry capable of descrambling the scrambled premium channel transmissions. Such circuitry is not shown in either FIGS. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this manner, the hotel or hospital system manager may maintain current status of all features and all interactive terminals of an a system comprising a plurality of hotels. For example, entertainment schedules, room status data or wake-up information may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over facility 6 to the two-way interactive terminals 7, 8 or 9. In particular, modulator 11 comprises the capability to generate signals for actuating the display of character screens at terminal locations responsive to the control of the system manager 12 in the event, for example, that terminals are unable to generate the character screens themselves.

The generation of complete screens of characters for transmission to a terminal according to the present invention for display is not required because the terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

Besides specifically addressed data communications with interactive terminals 7, 8 or 9, system manager 12 may also communicate with billing computer (Property Management System) 20. In a hotel, for example, the billing computer may be used at the front desk for check-in and check-out of guests and for reservations. Wake-up alarms, or other warning alarms sounded by system manager 12 can be sent to billing computer 20. System data can also be displayed on monitor 15 or printed on printer 18. System data can also be permanently stored on disk 17. System manager 12 may also address communications globally to all interactive terminals which communications may or may not require a terminal to respond. Such global communications, for example, may be addressed to a global address representing all terminals in the particular hotel system or to a group address representing a group of terminals within the system having a commonality of interest.

Each room terminal can be addressed using long addresses, short addresses, global addresses and group addresses. Each room terminal preferably has a unique 23 bit long address preset at the factory and stored in non-volatile memory. This address will always be recognized by the room terminal. To minimize communications overhead, a 12 bit short address may be configured by the system manager. The short address would be treated identically to the long address. This address would be unique to a particular building site. All room terminals are programmed to recognize a special global address to aid in sending system-wide commands. Normally, no response is given the command sent to a global address. An internal flag will be set to indicate that a global command has been received. This flag may be used by the system manager to verify receipt of global configuration commands. In order to maximize system performance, a group address may be implemented. This would speed the sending of data to groups of room terminals that are to be configured identically. This address would be handled by the room terminal as a second global address. It would be dynamically assigned by the system manager and be transparent to the system operator.

Each room terminal will communicate with the system manager using a polling protocol. Preferably, the room terminals are configured as slaves to the system manager. Each room terminal responds to commands sent by the system manager. A normal polling cycle causes a room terminal to report its current operating mode including its current channel or screen. This allows the gathering of channel statistics by the system manager. Additional information returned may include request by the room terminal for data resident in the system manager or information regarding commands initiated by keys pressed at the room terminal. The room terminal will also indicate upon polling by the system manager of a change in a normally monitored item such as that at the serial port. Besides normal polling cycles, additional information is available from the system manager on a request basis, including screen and configuration dumps. The polling communication between the room terminals and the system manager occurs on signals modulated at cable television frequencies such as EIA (Electronic Industries Association) television frequencies and other standard cable television frequencies. Further details are incorporated by reference to U.S. application Ser. No. 07/340,659 entitled "Terminal Polling Method."

Either the user of a terminal or an installer may configure and install their terminal themselves. Interactive terminals 7, 8 or 9 are, consequently, equipped with means for enabling automatic installation. Further details of automatic terminal configuration are provided in copending parent application Ser. No. 289,218 incorporated herein by reference.

Figure 2:
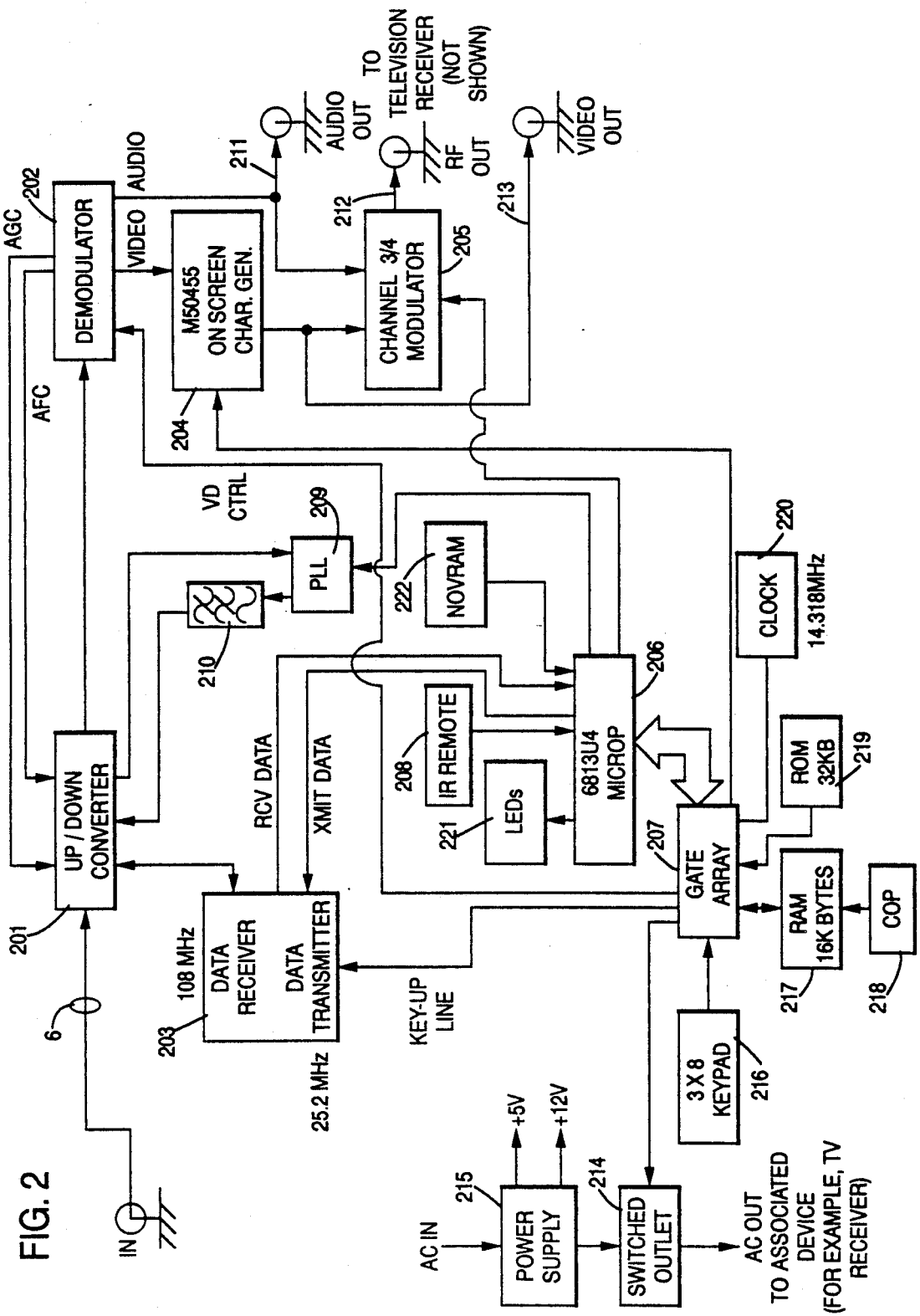
FIG. 2 is a block schematic diagram of a two-way interactive terminal according to the present invention comprising a microprocessor, a memory, a character generator, a keypad, and a television signal output to an associated television receiver.

Referring to FIG. 2, there is shown a two-way interactive terminal according to the present invention. The terminal is coupled via transmission link or facility 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel ¾ modulator 205. In this manner, on screen character generation may appear superimposed upon an incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of up/down converter 201.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of switched outlet 214 is controlled via gate array 207 by processor 206. For example, switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 comprise 32 kilobytes of memory respectively.

FIG. 2 also illustrates wake-up alarm 230 preferably a piezoelectric beeper. Other types of audible alarms may be used. In addition to character generation and screen display, LEDs 221 may, for example, indicate at least a power on condition or, additionally, an alternative display of tuned channel number or other data which may be displayed on a screen.

Once the user of a room terminal applies power to power supply 215 of FIG. 2, processor 206 begins the task of initialization of various types of components of the terminal of FIG. 2. Processor 206 verifies proper operation and communication of components of the terminal such as data transmitter and receiver 203, gate array 207, on screen generator 204, keypad 206 and infrared remote control receiver 208. Self-initiated diagnostic routines well known in the art to verify proper software operation may be performed at processor 206. Processor 206 may also enter an optional manufacturing or factory testing mode. It may also enter a maintenance or display RAM mode of operation activated by the depression of a predetermined key of keyboard 216 or receipt of data entered via remote control receiver 208.

Upon power up of the room terminal, when a reset command is received from the system manager, the room terminal will go through a series of tests. The RAM and ROM memory and the watchdog will be exercised to ensure proper operation. Any problems detected will be reported by the room terminal to the system manager. In order to protect data stored in the RAM memory, the RAM test is non-destructive. Particular commands also allow the exercising of specific hardware functions to enable thorough factory testing. Specific tests may include test of the video generator, system RAM, the alarm, the keyboard, the data transmitter, and other hardware.

The present invention allows predetermined configurations of a limited number keys on keypad 216, for example, seventeen different keys or a infrared remote control 208. A key template is stored in terminal memory for each display to be generated. The template defines an operation for particular keys associated with a display. For example, various displays are illustrated which result in the generation of different displays in response to the actuation of particular keys. In response to FIG. 11(c), the actuation of key "1" generates the display of FIG. 11(e) and the actuation of key "2" generates the display of FIG. 11(d). In such a fashion, any key can be configured for any function. For example, the "OK" key and the "BUY" key are configured for "if correct" and "to retry", respectively, in FIG. 11(g). Therefore, by assigning new functions to existing keys "CH+", "CH−", "Vol+", "Vol−", "BUY", etc., the invention permits programmable assignment of functions to keys which may have little or no relationship to key labelling. Furthermore, by reinforcing the assigned key function by means of screen display, a user may feel comfortable with their selection of particular key for performing a non-indicated function. In other words, the combination of screen display and programmable keys creates a human friendly interface between the user or the installer and the terminal.

Room status or wake-up communication from a room terminal can be selected by tuning the room terminal to a particular channel number that corresponds to a desired data screen. When the particular channel corresponding to the desired data screen is selected, normal tuner output is disabled and the text generating circuitry of character generator 209 is activated. A first screen of text is then displayed on the television receiver associated with the room terminal for the selected service such as wake-up.

In addition to the interactive modes described, an option exists for a mode allowing data entry even when the room terminal is in the "power off" state. This will allow maid status entry, for example, without requiring a maid to turn on an associated television. When a room terminal is "off" a power LED will be off, switched outlet 214 may be turned off, and the tuner will be tuned to the "off" channel. Upon power up, switched outlet 214 will be switched "on" and the room terminal will be tuned to a predetermined channel or text screen. Switched outlet 214 can be configured either to be always on or to switch off when the room terminal is turned "off". The power-up channel can also be programmed as a configurable parameter by the system manager.

When a data screen is active, the terminal, under the control of processor 203 is capable of selecting an audio or video channel or both from up-down converter 201. This audio/video channel can then complement the character generated display. Thus, music can be added to screens or even movie audio inserted over the screens. If no channel is specified for the audio, the volume control circuit of demodulator 202 is set to its minimum level. The volume control circuit of demodulator 202 will, however, remember the previous volume level and return to the previous volume level the next time an audio output is needed. Further details are incorporated herein by reference to U.S. application Ser. No. 07/342,987 entitled "Interactive Television Terminal with Programmable Background Audio or Video."

Processor 203 can control the audio volume control circuitry when requested by use of the volume up key, the volume down key and the mute key. Preferably, volume up and volume down will exhibit a total of 64 different levels. When one of these keys is pressed, the request will be repeated at a rate of about 100 msec. until the key is released. There will be an initial delay of about 500 msec. after the first step before the 100 msec. repeat has begun. Other rates and delays are within the purview of those of skill in the art. Mute will cause the volume to go down to the lowest level, but the previous level will be remembered. Pressing mute or volume up will cause the volume to return to the previous value. A volume up or down request may additionally be acted upon by the processor as desired. Volume up (down) will remain at the highest level (lowest) volume level once it is reached regardless of how many times the volume is up (down) key is subsequently pressed. When turned off, the room terminal will go to the lowest volume level. When turned back on, the room terminal will return to the previous volume level.

While text data is being displayed, the room terminal keys may be configured to behave in different manners as described above. A keystroke may cause a new page of data to be displayed and in turn reprogram the keys to a new set of actions corresponding to the new screen. This will be useful for implementing a menu type display. The key stroke or series of key strokes may be saved to be reported to the system manager. This is intended for functions needing verification from the system manager. Optionally, the digit keys may be echoed on the screen.

Periodically, the system manager will download screens into RAM 217 of a room terminal. Other screens will be permanently resident in the ROM 219 of a room terminal. The priority of screens will be determined by the system manager. If a screen for a requested function is not currently resident in a terminal's memory, the default screen will be displayed such as "please stand by . . . " while data is requested from the system manager. When the data is received it will be displayed. A channel number or the channel up, down or no buttons may be used to abort this sequence. Further details of the generation of character screens are incorporated herein by reference to U.S. application Ser. No. 07/340,731 entitled "Storage Control Method and Apparatus for an Interactive Television Terminal."

In this embodiment of service selection, specific unused channel numbers are assigned to identify particular features. For example, channel 76 would be assigned to the room status/inventory function and a unique feature start screen determined wherein either FIG. 1(a) or FIG. 11(a) is displayed. The unique feature start screen is displayed instead of an EIA (Electronic Industries Association) channel number. Furthermore, channel 77, for example, would be assigned to the wake-up feature wherein the screen of FIG. 14(a) is displayed.

In an alternative service selection embodiment, a menu driven interface is displayed at the room terminal. For example, rather than assigning channels 76 and 77 as above, only channel 76 would be assigned to a service menu. Room status and wake-up could then be selected along with other features from the service menu.

A room terminal user preferably tunes to the particular above-mentioned channel for a particular service by pressing an identifier key corresponding to a particular EIA channel. The identifier key corresponds to the particular channel by a list stored in the room terminal's memory. For example, when the user pushes the "1" key, the list in memory can designate the key to EIA channel 76 where the room status service is displayed. The list stored in the room terminal's memory is programmable by commands sent from the system manager, thus configuring particular keys to particular EIA channels.

FIG. 3 is an exemplary screen of tabulated room status information and menu selections. These screens are preferably displayed at system manager 12 or printed on printer 18. "Occupied" may be selected from the menu. When the user selects the "Occupied" option, the cursor is placed in the room box. If the user then enters a valid room name, the room specified is designated as "Occupied". Otherwise, an error message "invalid room" is displayed. "Vacant" can also be selected from the menu. When the user selects the "Vacant" option, the cursor is placed in the room box. If the user then enters a valid room name, the room specified is designated as "Vacant". Otherwise, an error message "invalid room" is displayed. "Clean" can also be selected from the menu. When the user selects the "Clean" option, the cursor is placed in the room box. The user then enters a valid room name, the room specified is designated as "Clean". Otherwise, an error message "invalid room" is displayed. The "Clean" designation signifies that a room has been cleaned by a maid, and that it is waiting to be inspected by a housekeeping supervisor. "Dirty" can also be selected from the menu. When the user selects the "Dirty" option, the cursor is placed in the room box. If the user then enters a valid room name, the room specified is designated as "Dirty". Otherwise, the error message "invalid room" is displayed. The "Dirty" designation signifies that a room has not been cleaned, or that the room has been inspected and rejected by the housekeeping supervisor. "Ready" can also be selected from the menu. When the user selects the "Ready" option, the cursor is placed in the room box. If the user then enters a valid room name, the room specified is designated as "Ready" Otherwise, an error message "invalid room" is displayed. The "Ready" designation signifies that the room has been cleaned, inspected, and accepted by the housekeeping supervisor. "Out-of-Service" can also be selected from the menu. When the user selects the "Out-of-Service" option, the cursor is placed in the room box. If the user then enters a valid room name, the room specified is designated as "Out-of-Service". Otherwise, an error message "invalid room" is displayed. The "Out-of-Service" status can be subsequently switched to either "Vacant" or "Occupied" at the discretion of the user and the room shall assume its last known status of "Clean", "Dirty", or "Ready". The above room status changes can also be stored on disk or sent to a central billing computer (Property Management System) if desire. The central billing can also print out the data if desired.

"View" can be selected from the main menu. When the user selects the "View" option, the cursor is placed in the room box. If the user then enters a valid room name, the screen page on which the specified room appears is displayed. Otherwise, an error message "invalid room" is displayed. The screen page corresponding to the specified room can display historical room status information including current status ("Occupied", "Clean", etc.), the name or ID of the maid who made up the room, the name or ID of the inspector who inspected the room, guest information, wake-up information or any other information on the system pertaining to the particular room viewed.

"Sort" can be selected from the menu. When the user selects the sort option, an alternate set of menu items appear as illustrated in FIG. 4. These menu items list room status conditions. The rooms can then be sorted by status condition and the rooms exhibiting a particular condition tabulated and illustrated as in FIG. 5. FIG. 5 illustrates a sort for all rooms exhibiting the "Dirty/Occupied" status condition. Note that rooms currently being cleaned have the "Dirty" status condition. Therefore, any sorting involving the "Dirty" status condition will have those rooms displayed as well, along with the highlighted inspector IDs.

When the room name is entered in the room box, a special name "All" can be entered to designate every room in the hotel/hospital. "All" is not a valid name when selecting the "View Room" option. A range of room names, such as 110–120, can also be entered into the room box, except when selecting the "View Room" option.

As described above, room status can be altered using the above described screens from the system manager. Futhermore, if these screens are available at the room terminals, room status can also be altered in a like fashion. In addition, a maid, by cleaning a room and logging into the room terminal of the present invention automatically alters the room status stored at the system manager from "Dirty" to "Clean". An inspector, after inspection of the room, will alter its status to either "Ready" or back to "Dirty". Further details of maid and inspector functions will be described below in conjunction with FIGS. 10(a)–10(c) and 11(a)–11(k). Furthermore, room status can also be altered from the central billing computer or any other interface to the present communication system if desired.

"Find Maid" can be selected from the menu. When the user selects the "Find Maid" option, the cursor is placed in the maid box as illustrated in FIG. 3. If the user then enters a valid housekeeper ID, the first occurrence of the screen page on which the specified maid appears is displayed. Otherwise, an error message "invalid maid" is displayed. If the housekeeper ID is not found (i.e., the specified maid is not actively cleaning the room) but has been active during the current day, the message "maid not active, last found in room XXX" will be displayed. Otherwise, only "maid not active" is displayed. If this maid is logged into several rooms simultaneously, the first occurrence is displayed. Other notices, for example, that a maid is not presently cleaning a room are also possible.

"Change IDs" can be selected from the menu. The screen of FIG. 6 is displayed when the user selects this option. The menu of items on the change ID screen of FIG. 6 are then possible. The user can select the "Add New Name" option and enter the employee name in the employee name box. Typically, the name will have a maximum character length. The system manager preferably treats the entire name as one string, and will not make any distinctions between first name, last name and middle initial. However, in an alternative embodiment, distinctions can be made between first name, last name and middle initial by treating them as more than one character string. When the user presses ENTER the cursor is placed in the authorization box. The user is then prompted to enter either "M" for "Maid" or "S" for "SUPERVISOR". The user is then prompted to enter a numeric code between the values of 0 and 999 inclusive into the identification box. Pressing "Esc" at any time during the input sequence will abort the entire add new name operation.

"Change Name" can also be selected from the menu to change the name of an employee who has already been added. "Change Identification" can also be selected from the menu to change the identification number of an employee who has already been added. "Change Authorization" can also be selected from the menu to change the authorization level of the employee. Preferably, the authorization level is toggled between maid and supervisor. Additionally, other authorization levels besides maid and supervisor may be provided.

"View Name" can be selected from the menu to blank the data displayed in all three boxes and place the cursor in the employee name box. The user then enters the desired name. When the name is found, it is displayed along with its authorization identification number. Otherwise, the message "name not found" is displayed. A comparison is performed by searching to match the character string for the user entered in the employee name box with the named employee's character string stored in the system manager data base. For example, if the user typed in the string "Smith" then the names "Smith", "Smithy" and "Smithinski" would all be considered as matching. In the case of multiple matches the user will be given the chance to view the next occurrence. Also, the comparison process shall not be case sensitive. Alternatively, other comparison techniques known to those of skill in the art can instead be used.

"View Identification" can be selected from the menu to blank all three boxes displayed and place the cursor in the identification box. The user may then type in an ID and if the ID is found it will be displayed along with its name and authorization. Otherwise, the message "ID not found" is displayed. "Display IDs" can be selected from the menu of FIG. 3. When "Display IDs" is selected a screen similar to FIG. 7 is displayed. "Backup Log" can be selected from the menu of FIG. 3. When "Backup Log" is selected the system manager stores a backup of gathered historical data onto the disk.

Figure 10A:
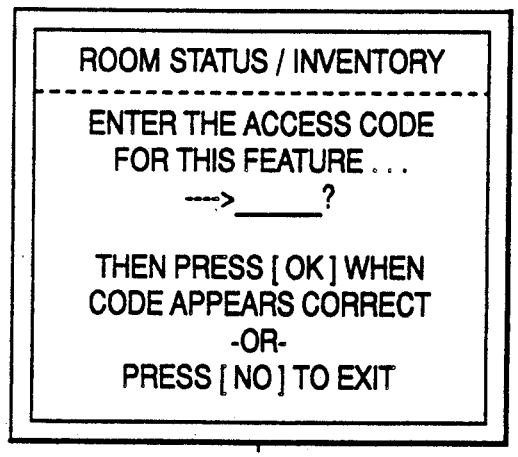
FIGS. 10(a)-10(c) are screens exemplary of maid sign-on and room cleaning functions generated for display on a television receiver associated with a room terminal according to FIG. 2.
Figure 10B:
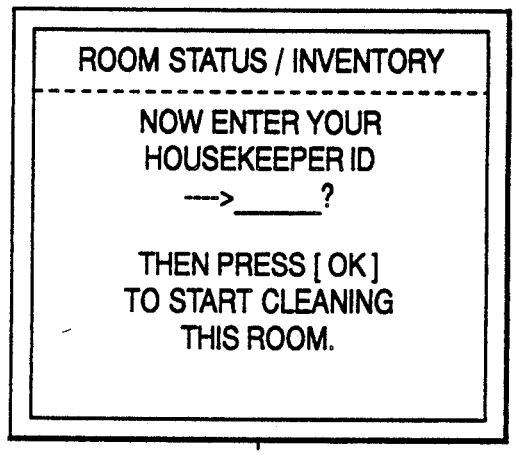
Figure 10C:
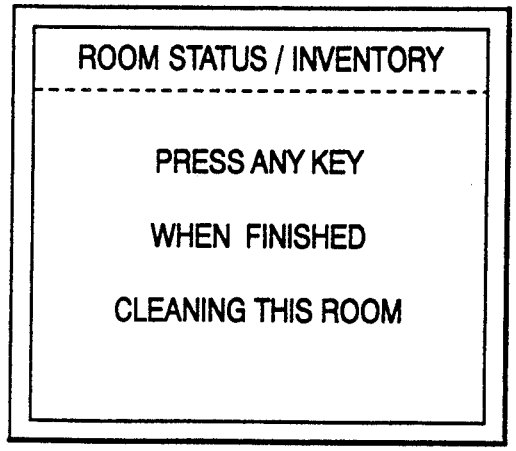

FIGS. 10(a)-10(c) illustrate the sequence of events a maid (housekeeper) will experience and FIGS. 11(a)-11(k) illustrate the sequence of events an inspector (housekeeping supervisor) will experience on the screen of the television associated with a room terminal. When room status/inventory is selected by tuning to the room status channel on a room terminal or by selecting room status on a main menu at a room terminal, the screen of either FIG. 10(a) or FIG. 11(a) will be displayed. An access code is then entered. The terminal compares the entered access code with legitimate secret access codes for an inspector or for a maid stored in terminal memory. If the access code is for a maid, the screen of FIG. 10(b) will be displayed; otherwise, if the access code is for an inspector, the screen of FIG. 11(b) will be displayed.

In response to the screen of FIG. 10(b), the maid then enters his or her housekeeper ID and begins cleaning the room. At this point the room status is automatically changed to "Occupied" or "Vacant" and being made up by a particular maid number. The start time of the maid's cleaning is also stored for maid timekeeping purposes. Furthermore, the location of the maid is stored for maid locating features. When the maid finishes cleaning the room any key can be pressed in response to FIG. 10(c) and room status is changed to "Clean". The time the room is finished being cleaned is also recorded.

The time a maid starts and finishes cleaning a room can be tabulated in a maid timekeeping matrix as shown in FIG. 9. The start time and finish time as well as the room number and maid number can be tabulated. This information can be stored as historical data on a disk or can be sent to the billing computer as desired. Time information for each maid can be sorted to determine the number of hours worked by a maid. This information can be tabulated by the system manager or the billing computer and analyzed to assist in maid scheduling activities. Furthermore, this information can be used in place of punch card timekeeping equipment for payroll purposes. Special screens can be used for input of sign-in and sign-out information at the beginning and end of a maids work day. Furthermore, special screens other than that of FIG. 9 and similar to that of FIG. 4 can be used for displaying and sorting maid time information. Time-keeping features, as discussed above for maids, can also be used for other employees such as inspectors, clerks, cooks, and bellhops or the like. In a hospital environment, the activities may be monitored for scheduling medicine delivery, hospital bed linen changing and the like. In addition to using the timekeeping information for payroll purposes, the timekeeping information may also be used for time/task efficiency studies.

Preferably, the system manager keeps a log of maid and time information and supervisor transactions similar to that of FIG. 7. A maximum of 31 daily housekeeping files are kept (i.e., for one month of historical data) although any number is possible. A new file will override its counterpart from a previous month.

While a maid is making up a room (i.e., room status is vacant, dirty or being cleaned), the room terminal can be programmed so that the television cannot be tuned to any television program or entertainment like distraction. Commands for initiating these features can be sent from the system manager to the room terminal where they are stored in RAM. Furthermore, these features can also be preset in ROM if desired.

In response to FIG. 11(a), when the access code for inspection is entered, the screen of FIG. 11(b) is displayed. After the housekeeping supervisor ID is entered, the housekeeping supervisor can select to approve/reject rooms or to display a list of rooms for inspection in accordance with FIG. 11(c). An exemplary display of rooms to inspect is illustrated in FIG. 11(d).

The selection of a single room or a range of rooms to approve/reject is selected from the display exemplified by FIG. 11(e). After a single room is inspected, the room name is entered in accordance with the screen exemplified by FIG. 11(f). After the room name is entered, a key configured for accepting the room, rejecting the room, retrying the room, etc. is selected in accordance with FIG. 11(f). Rejected rooms are returned to the "Dirty" status and accepted rooms are given "Ready" status.

To inspect a range of rooms, the beginning of the range of rooms is entered in accordance with the screen exemplified by FIG. 11(g) and the end of the range of the rooms is entered in accordance with the screen exemplified by FIG. 11(h). The range of rooms can then be accepted, rejected or cancelled in accordance with the screen exemplified by FIG. 11(i). If accepted, inspection continues with FIG. 11(k) and if the range of rooms is rejected inspection continues with the screen exemplified by FIG. 11(j). Another range of rooms can then be selected, the supervisor menu can then be chosen or inspection can then be terminated.

When the list of rooms ready to inspect is selected in accordance with the screen exemplified by FIG. 11(d), only nearby rooms instead of all rooms may be displayed. For example, rooms on the current floor, the two floors above and the two floors below the room terminal are displayed. If this data comprises more than one screen, the first screen that contains a room on the current floor will be the first one shown. The current floor is computed by using the room name and ignoring the two least significant digits. However, other schemes of determining current floor can be used. When computing the floors above and below, the thirteenth floor may be ignored because of the predominant custom in the United States of America. For rooms that exist with 13XX designations they will be shown, but they are assumed not to exist. Thus, if you are on floor 12, rooms ready for inspection on floors 10, 11, 12, 14, and 15 (and 13 if they exist) will be displayed. The rooms will always be shown in ascending numerical order. It may also be desirable to indicate the floor numbers on the screen in addition to the room numbers. This would prevent a supervisor from thinking that these are the only rooms in the entire building that need inspection. Furthermore, the number of floors above and below those displayed may also be altered such that all floors are displayed or particular floors for a particular supervisor ID are displayed.

FIG. 12 illustrates a screen tabulating wake-up information by room. The screen can be selected at the system manager in response to a main menu such as that of the screen exemplified by FIG. 8. An "Add" wake-up room option can be selected where the cursor is placed in the room box and the user enters the room to be added to the wake-up system. The cursor then jumps to the time box where the user enters the time that the guest asks to be awakened. A "Delete" wake-up room option can be selected where the cursor is placed in the room box and the user enters the room to be taken out of the wake-up alarm system. The room may also be automatically taken out of the wake-up schedule when the alarm time matches the system clock. Wake-up times and add and delete information can be entered by the billing computer instead of by the user of the system manager. Furthermore, as will be described in conjunction with FIGS. 14(a) and 14(b), wake-up alarms times can be directly entered at the room terminal by a guest.

Figure 8:
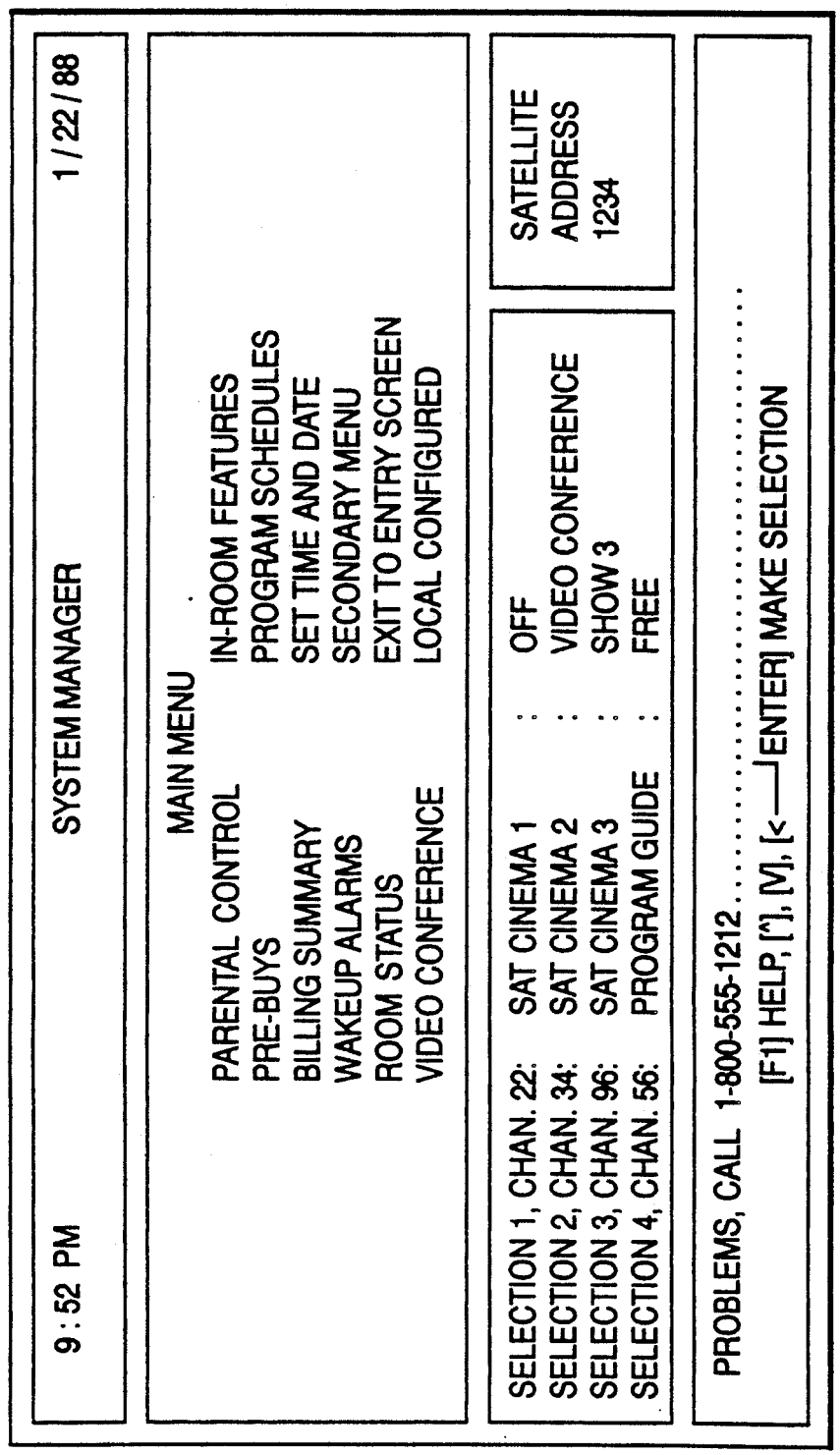
FIG. 8 is another exemplary screen of an initial menu.
Figure 13:
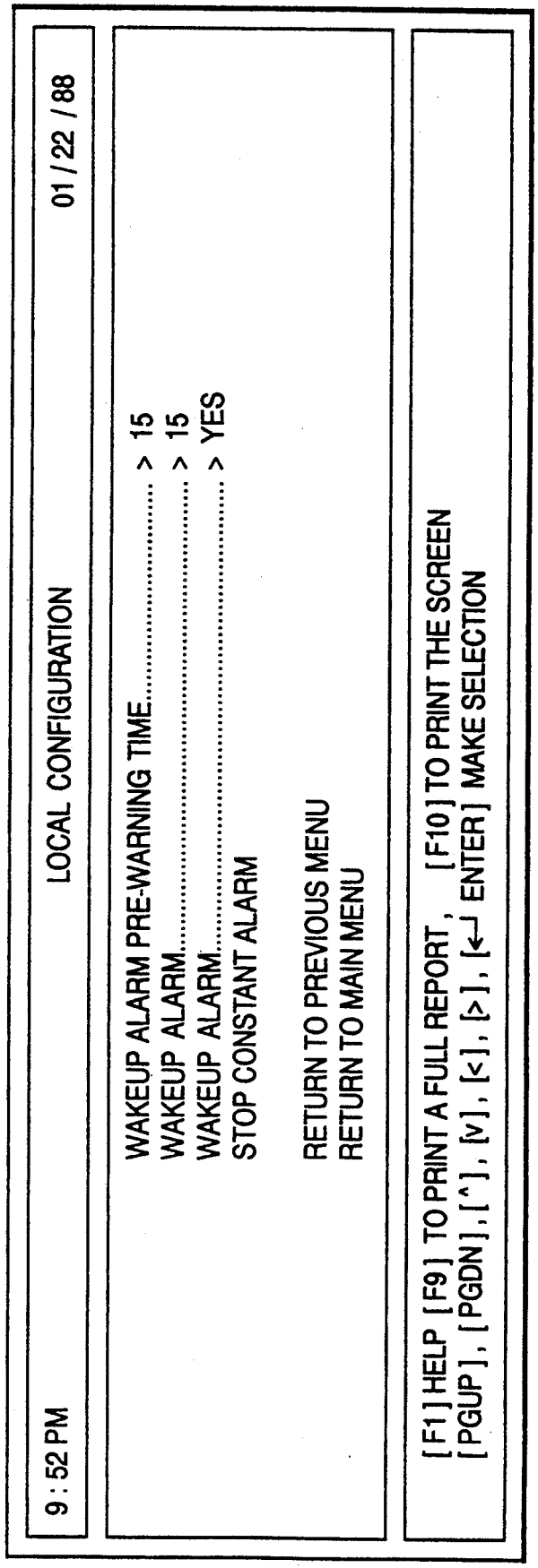
FIG. 13 is another exemplary screen for display at the system manager of wake-up alarm configuration parameters.

Wake-up alarm functions can be configured at the system manager as exemplified by the screen of FIG. 13 preferably displayed in response to the menu of FIG. 8. Only the system manager can control configuration of alarm functions. The local configuration allows a backup in case one or more room terminals is in an inoperative or error condition. Such a problem could exist if the room terminal either did not receive the initial command to set up the alarm sequence or the room terminal is not responding, meaning it could be in a loss of power situation. Under either of these or related conditions, the system manager will beep, display a message and if desired, print on a printer the rooms needing manual wake-up calls. The system manager can also under either of these conditions, send a warning alarm to the central billing computer or to a room terminal at a bellhop's station or a room terminal near the front desk. The wake-up alarm pre-warning time can be set to a predetermined number of minutes in advance of the scheduled wake-up time. The system manager will indicate that manual wake-up calls, such as telephone calls, are necessary in lieu of automatic wake-up calls by the room terminal. For example, a room's wake-up time is set at 6:00 a.m. and the pre-warning time is 15 minutes, where at 5:45 a.m. if the set-top is in one of the error conditions, the beeping and warning message described above at the system manager is performed.

A desired alarm duration is set by the system manager as a "wake-up alarm still on warning time" according to the local configuration as exemplified by FIG. 13. The wake-up alarm still on warning time is the number of minutes a particular guest has after sounding of the alarm to enter any key at the room terminal or a room terminal remote control to disable the alarm. If a guest does not disable the alarm before the end of the wake-up alarm still on warning time, the system manager will beep and display a warning message and can if desired, print a list of rooms needing personal wake-up calls. The system manager can also send a warning alarm to the billing computer or to a room terminal at a bellhop's office, a maid station or a room terminal near the front desk. A personal visit to the room may be desired in the instance the guest is a heavy sleeper or there has been an emergency such as the guest has had a heart attack. For example, if a room's wake-up time is 6:00 a.m. and the still on warning time is 15 minutes, then at 6:15 a.m. if the room terminal alarm is still active and the feature is enabled, the warning actions described are taken. This also may set the actual duration of the audible alarm in the room and reset the terminal to an idle, "alarm off" condition.

In the preferred environment, each room terminal has an internal real time clock. The real time clock is capable of keeping time on its own. However, for improved accuracy an update signal is globally sent by the system manager to the room terminals. This update signal is sent every minute by the system manager. The system manager receives time information preferably by satellite to calibrate its time clock. Thus, the system manager can be calibrated via satellite in accordance with an accurate time source such as the National Bureau of Standards. Consequently, if at any time the system manager is not in synchronization with such a standard, the system manager and the terminals which it serves may be automatically recalibrated.

For example, in the event of a power failure at the system manager but not at the room terminal, the internal clock of the room terminal will keep the time. In this event, wake-up calls can still be performed as programed at the room terminal location even though there is a power failure at the system manager.

In the event of a power failure at the room terminal, the room terminal will be unable to keep time or sound the wake-up alarm until power resumes. When power resumes at the room terminal, the system manager will send the update signals that should have been received during power failure. These update signals are preferably sent at a fast rate of one signal per 150 miliseconds. The room terminal will quickly add each minute lost during the power failure to regain the correct time. If a wake up call was programmed to occur during the power failure, the clock will increment through every minute during the power failure and thus sound the wake-up alarm when the programmed time is established during the incrementing.

The real time clock of the room terminal preferably is an interupt driven subroutine programmed with the microprocessor. However, alternative clock embodiments are possible. For example, the microprocessor can be a "dumb" clock whereby time is only incremented when an update signal is sent every minute by the system manager. In such an instance, in the event power fails at the system manager but does not fail at the room terminal, the time will freeze at the room terminal and not change until power is regained at the system manger. In an additional alternative embodiment, for example, a real time clock module can be used at the room terminal. This real time clock module would be similar to that used in a digital alarm clock. This real time clock module would be acurate enough, that update signals from the system manager would not be necessary, although may still be desired so that all rooms may be synchronized to the same clock.

FIGS. 14(a) and 14(b) illustrate the sequence of wake-up screens displayed on a television associated with a room terminal. The screen of FIG. 14(a) can be selected for display by entering a predetermined wake-up channel via the terminal's keyboard or, alternatively, by selecting wake-up on a main system menu or directory, for example, by tuning to channel 1. As indicated in FIG. 14(a), a guest can view the scheduled wake-up time. Pressing the "No" key displays the screen of FIG. 14(b). The display of FIG. 14(b) displays the current time in AM and PM format. The guest can clear the alarm to deactivate wake-up by pressing the "NO" key. The guest can set the alarm by pressing the "CH+" key. The numeric keys can then be used to input a new wake-up time. The "BUY" key can be pressed to toggle the wake-up time between AM and PM. In response to a polling request, after a new wake-up time is entered, the room terminal sends the wake-up time along with its room identification to the system manager. The "OK" key can be depressed to return the display back to the main system menu (or "directory") or a predetermined wake-up channel containing the display of FIG. 14(a). Alternatively, military time format can be configured by the system manager for use rather than AM and PM indicators.

The system manager configures the room terminal to either clear the wake-up setting or maintain the wake-up setting for the next day, after a wake-up alarm has been sounded. A room terminal is preferably configurable to respond according to one of four options when a wake-up alarm is sounded: option 1—clear any wake-up setting upon checkout; option 2—clear any wake-up setting upon checkin; option 3—never clear the wake-up setting; option 4—clear the wake-up setting after sounding the alarm.

What is claimed is:

1. Two-way interactive room terminal for communicating room status information with a system manager of a cable television system, the terminal comprising:
   memory means for storing data for generating a plurality of predetermined character screens and for storing room status data, said character screen data comprising character screen commands and said room status data comprising room status information;
   character generator means for generating character screens from the stored character screen data;
   data entry means for entering room status information in response to at least one character screen;
   two-way cable television transceiver means, for communicating with the system manager; and
   control means for processing entered room status information, for controlling said memory means and said character generator means for composing at least one predetermined character screen related to room status information requiring a data entry response, and for further controlling said two-way transceiver means for communicating processed room status information with the system manager.

2. The two-way interactive room terminal of claim 1, wherein the at least one screen of characters comprises an indication of the entered room status information.

3. The two-way interactive room terminal of claim 2, wherein the at least one screen of characters further comprises an indication of rooms to be prepared for occupancy.

4. The two-way interactive room terminal of claim 2, wherein the at least one screen of characters further comprises an indication of rooms to be inspected.

5. The two-way interactive room terminal of claim 2, wherein the at least one screen of characters further comprises an indication of one or more of the following status indications: occupied, vacant, clean, dirty, ready, or out-of-service.

6. The two-way interactive room terminal of claim 1, wherein the at least one screen of characters indicates the location of at least one maid or inspector.

7. The two-way interactive room terminal of claim 1, further comprising a tunable up/down video converter, responsive to the control means, for tuning cable television channels for reception at a television receiver, and being further coupled to the transceiver means, for transmitting data to and receiving data from the system manager.

8. The two-way interactive room terminal of claim 1, wherein the data entry means comprises a remote control.

9. The two-way interactive room terminal of claim 1, wherein the data entry means comprises a keyboard.

10. The two-way interactive room terminal of claim 1, wherein at least one other display screen indicates functions assigned to said data input means.

11. The two-way interactive room terminal of claim 1, further comprising an on/off switch and an AC outlet controlled by the on/off switch, the terminal capable of data entry and communication with the system manager regardless of the state of the on/off switch.

12. Two-way interactive room system comprising:
   at least one room terminal comprising an audible wake-up alarm, a keyboard having at least one key, and a two-way transceiver for communicating data comprising at least wake-up data at cable television frequencies, the wake-up data comprising the time the audible wake-up alarm is to be activated;
   a system manager comprising a two-way transceiver for communicating at least the wake-up data with at least one room terminal at cable television frequencies; and
   a television transmission link for connecting the transceivers of the system manager and the at least one room terminal.

13. The room system of claim 12, wherein the two-way transceiver of the at least one room terminal sends a wake-up alarm responded to signal at cable television frequencies over the television transmission link to the system manager two-way transceiver upon actuation of the at least one key of the keyboard of the room terminal to turn off the audible wake-up alarm.

14. The room system of claim 13, wherein the system manager indicates a first warning condition if a predetermined warning time after the activation of the audible wake-up alarm has lapsed and said wake-up alarm responded to signal has not been received.

15. The room system of claim 13, wherein the system manager indicates a second warning condition at a predetermined pre-warning time before a scheduled alarm time if a room terminal is incapable of activating the audible wake-up alarm at the scheduled alarm time.

16. The room system of claim 13, wherein scheduled alarm times may be entered at the keyboard of the room terminal or at the system manager.

17. The room system of claim 14, wherein the predetermined warning time may be entered at the system manager.

18. The room system of claim 12, wherein the at least one room terminal responds to polling signals from the system manager.

19. The room system of claim 12, wherein the at least one room terminal further comprises a character generator for generating at least one display of characters related to wake-up data.

20. Two-way interactive room terminal for communication of wake-up information with a system manager of a cable system, the terminal comprising:
   a processor for processing data, the data comprising wake-up data, the wake-up data comprising wake-up time information;
   a memory associated with said processor for storing the wake-up data;
   a keyboard for inputting wake-up information to the terminal;
   an audible wake-up alarm, responsive to the processor and the processed wake-up data;
   a character generator, responsive to the processor, for generating at least one display screen of characters related to wake-up time information requiring keyboard response; and
   a two-way cable television transceiver, responsive to the processor, for communicating wake-up information with the system manager.

21. The two-way interactive room terminal of claim 20, wherein the at least one screen of characters indicates entered wake-up information.

22. The two-way interactive room terminal of claim 20, wherein the room terminal sends a wake-up alarm responded to signal to the system manager upon activation of at least one key on the keyboard to turn off the audible wake-up alarm.

23. The two-way interactive room terminal of claim 22, wherein the system manager indicates a first warning condition if a predermined warning time after the activation of the audible wake-up alarm has lapsed and said wake-up alarm responded to signal has not been received.

24. The two-way interactive terminal of claim 20, wherein the system manager indicates a second warning condition at a predetermined pre-warning time before a scheduled alarm time if a room terminal is incapable of activating the audible wake-up alarm at the scheduled alarm time.

25. The two-way interactive room terminal of claim 20, wherein scheduled alarm times may be entered at least at the keyboard of the room terminal.

26. The two-way interactive room terminal of claim 20, wherein the two-way cable television transceiver communicates with the system manager at cable television frequencies.

27. The two-way interactive room terminal of claim 20, wherein the room terminal responds to polling signals from the system manager.

28. The two-way interactive room terminal of claim 20, further comprising a tunable up//down video converter, responsive to the processor, for tuning cable television for reception at a television receiver and, being further coupled to the transceiver means, for transmitting data to and receiving data from the system manager.

29. The two-way interactive room terminal of claim 20, further comprising a real time clock, said audible alarm being further responsive to said real time clock.

30. The two-way interactive room terminal of claim 29, wherein said system manager receives time calibration signals from a satellite and periodically sends time update signals to said room terminal.

31. The two-way interactive room terminal of claim 20, wherein the character generator generates a display screen indicating functions assigned to keys on the keyboard.

32. The two-way interactive room terminal of claim 20, further comprising an on/off switch and an AC outlet controlled by the on/off switch, the terminal capable of keyboard entry and communication with the system manager regardless of the state of the on/off switch.

33. The two-way interactive room terminal of claim 20, wherein the keyboard comprises a remote control.

34. A method of communicating room status information between a room terminal at a particular room location and a system manager of a cable television system, the method comprising the steps of:
   a. receiving data at the system manager transmitted from the room terminal indicating a particular employee has begun work at said particular room location at a first point in time when the work begins;
   b. storing at the system manager a label for the particular room location and a label for the particular employee with data indicating said first point in time;
   c. receiving data at the system manager transmitted from the room terminal indicating work completion at said particular room location at a second point in time when the work is completed, said second point in time occurring after said first point in time; and
   d. storing at the system manager data indicating said second point in time.

35. The method of claim 34, wherein step b. further comprises the step of storing a status of dirty with said labels and step d. further comprises the step of changing said status of a particular room location from dirty to clean.

36. The method of claim 35, further comprising the steps of:
   e. receiving at the system manager inspection data transmitted from a room terminal indicating inspection of a particular room location; and
   f. storing at the system manager said inspection data for a particular room location.

37. The method of claim 36, wherein said inspection data indicates whether said particular room location has a ready or a dirty status, and wherein step f. further comprises the step of changing said status for said particular room location to the ready or the dirty status indicated by said inspection data.

38. A method of communicating accurate time information between a room terminal and a system manager of a cable television system, said system manager having an internal clock, the method comprising the steps of:
 a. periodically receiving at the system manager accurate time data sent from a satellite; and
 b. transmitting a time update signal from said system manager to said room terminal.

39. The method of claim 38 further comprising step of the calibrating said system manager internal clock from the periodically received accurate time data.

40. A method of communicating accurate time information between a terminal and a system manager of a cable television system, both said room terminal and system manager having internal clocks, the method comprising the steps of:
 a. periodically receiving at the system manager accurate time data sent from a satellite; and
 b. transmitting a time update signal from said system manager to said room terminal.

41. The method of claim 40 further comprising the calibration of said system manager internal clock after periodically receiving accurate time data.

42. The method of claim 41 further comprising step of the calibrating said room terminal internal clock after receiving the time update signal.

* * * * *

UNITED STATES PATENT AND TRADEMARK OFFICE
CERTIFICATE OF CORRECTION

PATENT NO. : 4,994,908

DATED : February 9, 1991

INVENTOR(S) : Curt M. Kuban et al.

It is certified that error appears in the above-identified patent and that said Letters Patent is hereby corrected as shown below:

In the drawings, Sheet 1, Figure 1, the following elements should be shown;

a box labeled as MONITOR 15 should be shown connected to the box labeled HOTEL/HOSPITAL SYSTEM MANAGER 12 with a single connecting line;

a box labeled as KEYBOARD 16 should be shown connected to the box labeled HOTEL/HOSPITAL SYSTEM MANAGER 12 with a single connection line;

a box labeled as DISK 17 should be connected to HOTEL/HOSPITAL SYSTEM MANAGER 12 with a single connection line;

a box labeled as PRINTER 18 should be connected to the box labeled HOTEL/HOSPITAL SYSTEM MANAGER 12 with a single connection line; and a box labeled BILLING COMPUTER 20 should be connected to the box labeled HOTEL/HOSPITAL SYSTEM MANAGER 12 with a single connection line.

In the drawings, Sheet 2, Figure 2, the following elements should be shown:

a box labeled SERIAL PORTS 229 should be connected to the box labeled GATE ARRAY 207 with a single connection line; and

UNITED STATES PATENT AND TRADEMARK OFFICE
CERTIFICATE OF CORRECTION

PATENT NO. : 4,994,908

DATED : February 9, 1991

INVENTOR(S) : Curt M. Kuban et al

It is certified that error appears in the above-identified patent and that said Letters Patent is hereby corrected as shown below:

a box labeled ALARM 230 should be connected to the box
        labeled GATE ARRAY 207 with a single connection line.

In the drawings, Sheet 2, Figure 2, COP 218 should read CAP
    218.

Signed and Sealed this

Twenty-ninth Day of December, 1992

*Attest:*

DOUGLAS B. COMER

*Attesting Officer*      *Acting Commissioner of Patents and Trademarks*

Disclaimer

4,994,908—Curt M. Kuban, Snellville; Jeffrey C. Ting, Lawrenceville; Fitzroy E. Williams, Lawrenceville; Lee R. Johnson, Lawrenceville; Elizabeth A. Smith, Cumming; Howard L. Myers, Lawrenceville, all of Ga. INTERACTIVE ROOM STATUS/TIME INFORMATION SYSTEM. Patent dated February 19, 1991. Disclaimer filed November 25, 1997, by the assignee, Scientific-Atlanta, Inc.

Hereby enters this disclaimer to claims 38, 39, 40, 41, and 42 of said patent.
*(Official Gazette, May 8, 2001)*